United States Patent [19]

Sato

[11] Patent Number: 5,523,855
[45] Date of Patent: Jun. 4, 1996

[54] DISCRIMINATING DEVICE FOR AUTOMATICALLY DISCRIMINATING BETWEEN RECORDED VIDEO SIGNAL REPRODUCTION MODES

[75] Inventor: Kouichi Sato, Tokyo, Japan

[73] Assignee: Asahi Kogaku Kogyo Kabushiki Kaisha, Tokyo, Japan

[21] Appl. No.: 304,142

[22] Filed: Sep. 12, 1994

Related U.S. Application Data

[63] Continuation of Ser. No. 403,973, Sep. 7, 1989, abandoned.

[30] Foreign Application Priority Data

Sep. 13, 1988 [JP] Japan .................................. 63-229242

[51] Int. Cl.$^6$ ...................................................... H04N 5/76
[52] U.S. Cl. .......................... 358/335; 358/342; 358/330; 358/310; 360/33.1; 360/27
[58] Field of Search ................................ 358/335, 310, 358/330, 342; 360/33.1, 35.1, 27, 28, 30; 348/437, 438, 235; 369/32, 48; H04N 5/76

[56] References Cited

U.S. PATENT DOCUMENTS

| | | | |
|---|---|---|---|
| 4,430,675 | 2/1984 | Fujime | 358/342 |
| 4,686,585 | 11/1987 | Sato | 358/310 |
| 4,698,702 | 10/1987 | Miyake | 358/907 |
| 4,786,986 | 11/1988 | Yamanushi et al. | 360/27 |
| 4,991,027 | 2/1991 | Enoki | 358/310 |

FOREIGN PATENT DOCUMENTS

| | | |
|---|---|---|
| 0171288 | 2/1986 | European Pat. Off. . |
| 0287682 | 10/1988 | European Pat. Off. ............... 358/335 |

OTHER PUBLICATIONS

European Search Report #8920684.1.
French Search Report FA 8911987-8-8-28-91.

Primary Examiner—Tommy P. Chin
Assistant Examiner—Huy Nguyen
Attorney, Agent, or Firm—Sughrue, Mion, Zinn, Macpeak & Seas

[57] ABSTRACT

A mode discriminating device which discriminates whether a normal mode or a high-band mode is used to reproduce a recorded video signal. If the reproduction level is too low and/or the noise level is too high, a mute signal is used in determining the discriminating signal so that an erroneous detection thereof is not carried out.

10 Claims, 2 Drawing Sheets

DISCRIMINATING DEVICE FOR AUTOMATICALLY DISCRIMINATING BETWEEN RECORDED VIDEO SIGNAL REPRODUCTION MODES

This is a Continuation of application Ser. No. 07/403,973 filed Sep. 07, 1989, abandoned.

BACKGROUND OF THE INVENTION

The present invention relates to a mode discriminating device for discriminating photographing modes in a still video system in which a picture which has been photographed using, for instance, an electronic still camera is reproduced from a magnetic disc.

Electronic still cameras are available which operate in a normal mode, a high-band mode, and in both a normal mode and a high-band mode by switching them back and forth. In an electronic still camera operating in a normal mode, as shown in FIG. 2, the luminance signal of the video signal is frequency modulated with a frequency shift of 1.5 MHz from a sync. tip frequency of 6 MHz to a peak white frequency of 7.5 MHz. In an electronic still camera operating in a high-band mode, as shown in FIG. 3, the carrier (DPSK signal) for the ID signal and the carrier for the color signal are similar to those in the electronic still camera operating in the normal mode. However, the luminance signal is frequency-modulated with a frequency shift of 2.0 MHz between a sync. tip frequency of 7.7 MHz and a peak white frequency of 9.7 MHz. Thus, in the high-band mode, the horizontal resolution is higher and the resultant image has a higher picture quality than in the normal mode.

In playback of a magnetic disc on which signals have been recorded in one of these two recording modes, it is necessary to detect the recording mode in which the signals have been recorded on the magnetic disc.

Video tape recorders (VTR) can be used in which the normal mode and the high-band mode are provided. The mode discriminating device thereof may be applied to a still video system as shown in FIG. 4.

In FIG. 4, a magnetic head 1 reads a signal from a magnetic disc (not shown). The RF signal thus read is applied to a reproducing amplifier 2, the output of which is applied to band-pass filters 3 and 4. As shown in FIG. 5, the central frequencies of the band-pass filters 3 and 4 are set in the normal mode carrier frequency band whose central frequency is about 7 MHz and in the high-band mode carrier frequency band whose central frequency is about 9 MHz, respectively. Therefore, when the normal mode carrier is reproduced, a smoothing circuit 5 for smoothing the output of the band-pass filter 3 outputs a signal at a predetermined level. In this operation, the output level of a smoothing circuit 6 adapted to smooth the output of the band-pass filter 4 is much lower than that of the smoothing circuit 5. Similarly, when the high-band mode carrier is reproduced, the smoothing circuit 6 provides a signal at a predetermined level, whereas the output level of the smoothing circuit 5 is much lower than that of the smoothing circuit 6. The output levels of the smoothing circuits 5 and 6 are compared with each other in a comparator 7. For instance, when the output level of the smoothing circuit 5 is higher, the comparator 7 outputs a logic level signal "0" and when the output level of the smoothing circuit 6 is higher, the comparator 7 provides a logic level signal "1". When the difference between the carrier levels becomes small in absolute value, a hold control circuit 8 operates to hold the output of the comparator 7, thereby to prevent error in discrimination of the recording mode. Thus, the recording mode can be determined from the output of the hold control circuit 8.

However, the circuit shown in FIG. 4 is disadvantageous in that two band-pass filters are necessary. Thus, a relatively large area is occupied when the resultant device is installed, and it is accordingly unavoidably bulky.

SUMMARY OF THE INVENTION

Accordingly, an object of the present invention is to provide a mode discriminating device in which only one band-pass filter is employed, which allows miniaturization of the device.

The foregoing object of the present invention has been achieved by the provision of a mode discriminating device which, according to the present invention, comprises: a band-pass filter for extracting a first carrier having a first frequency band from a signal which is reproduced from a disc on which a video signal frequency-modulated with the first carrier or a second carrier having a second frequency band is recorded; a first comparator for comparing an output of the band-pass filter with a predetermined reference value; a second comparator for comparing the signal reproduced from the disc with a predetermined reference value without extracting the first or second carrier; and a logic circuit for referring to outputs of the first and second comparators to discriminate the carrier available and to output a corresponding decision signal.

In the mode discriminating device of the present invention, the central frequency of the band-pass filter is set, for instance, in the first carrier frequency band (or in the second carrier frequency band). Therefore, the first comparator outputs, for instance, the logic level "1" when the first carrier is reproduced, and the logic "0" when the second carrier is reproduced. On the other hand, the second comparator outputs the logic level "1" irrespective of the reproducing modes as long as a reproducing carrier is available. Hence, the carrier (mode) can be accurately determined by applying the outputs of the two comparators to a logic circuit such as an AND gate.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Figure 1:
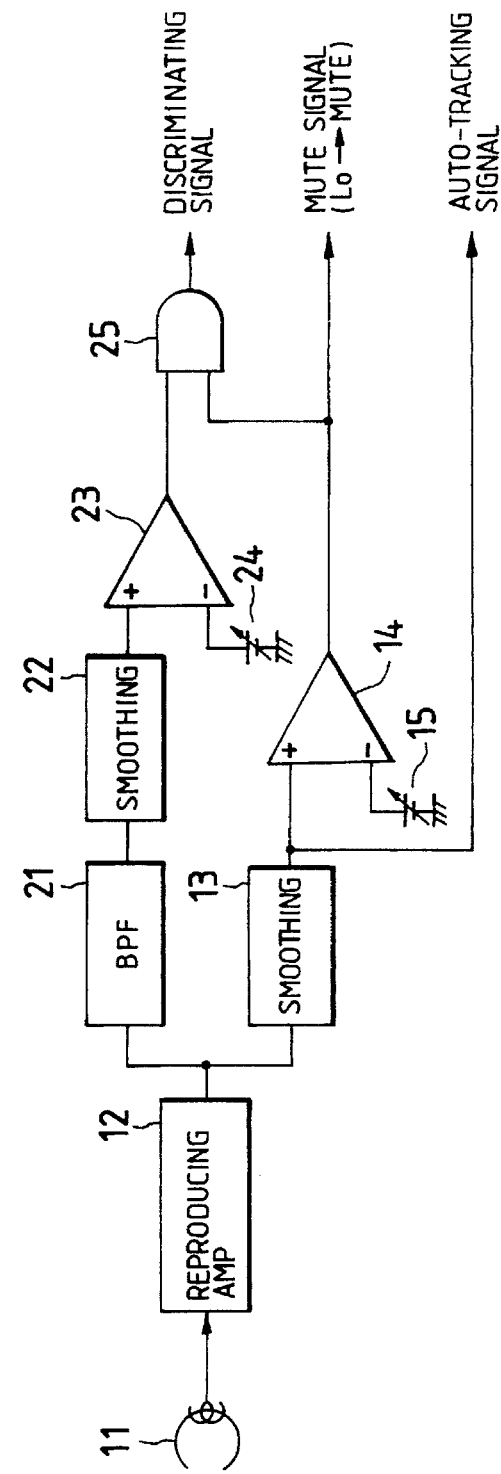
FIG. 1 is a block diagram showing the arrangement of one embodiment of a mode discriminating device according to the present invention.
Figure 4:
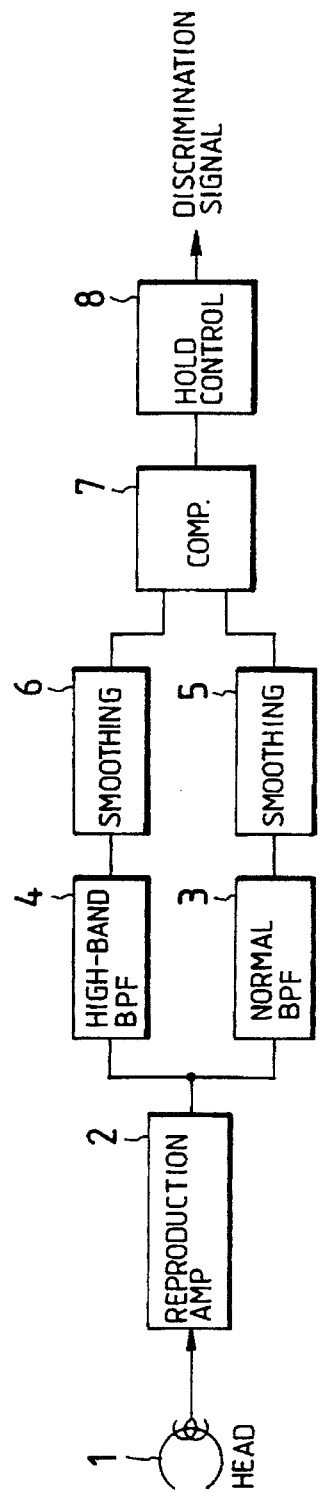
FIG. 4 is a block diagram showing the arrangement of a mode discriminating device improved upon by the present invention.
Figure 2:
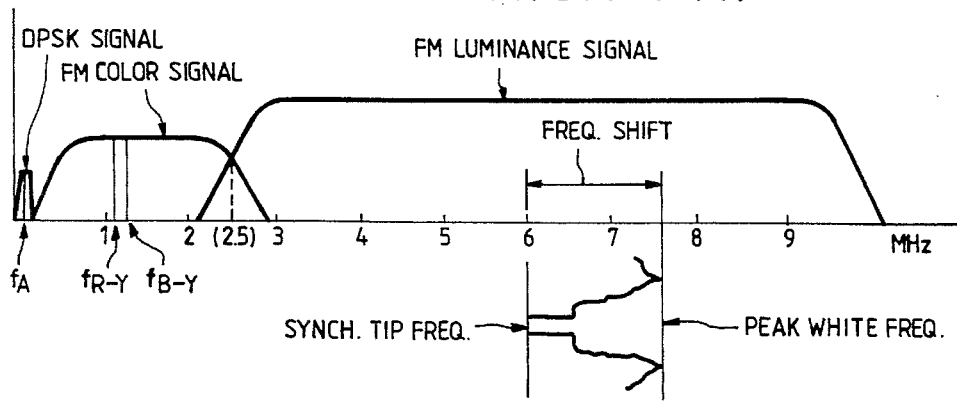
FIG. 2 is a diagram showing a normal mode frequency allocation in an electronic still camera.
Figure 3:
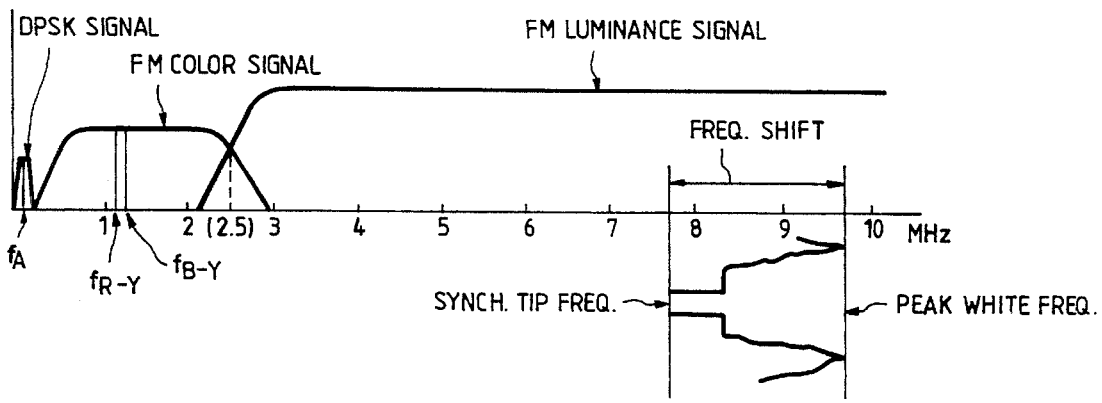
FIG. 3 is a diagram showing a high-band mode frequency allocation mode in an electronic still camera.
Figure 5:
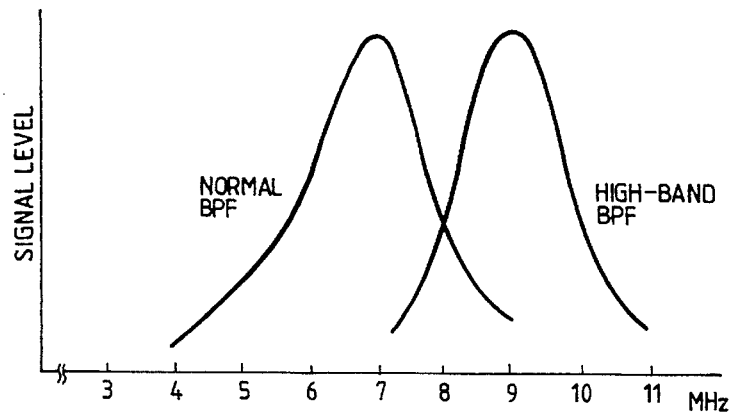
FIG. 5 is a characteristic diagram showing the frequency characteristics of the band-pass filters shown in FIG. 4.

FIG. 1 is a block diagram showing one embodiment of a mode discriminating device according to the present invention. In FIG. 1, a magnetic head 11 reproduces video signals recorded on a magnetic disc (not shown). A reproducing amplifier 12 amplifies the output of the magnetic head 11. A smoothing circuit 13 smooths the output of the reproducing amplifier 12. The output of the smoothing circuit 13 is applied to the positive input terminal of a comparator 14. A reference voltage generating circuit 15 applies a reference voltage at a predetermined level to the negative input terminal of the comparator 14. The output of smoothing circuit 13 is also provided as a tracking signal and the output of comparator 14 is provided as a mute signal.

A band-pass filter (BPF) 21 is connected to the reproducing amplifier 12, the central frequency being set in the high-band mode or normal mode carrier frequency band (the high-band mode carrier frequency band being used in the mode discriminating device shown in FIG. 1). A smoothing circuit 22 smooths the output of the band-pass filter 21. The output of the smoothing circuit 22 is applied to the positive input terminal of comparator 23. A reference voltage generating circuit 24 supplies a reference voltage at a predetermined level to the negative input terminal of the comparator 23. An AND gate 25 receives the outputs of the two comparators 14 and 23 to discriminate the carrier (mode) and to output a corresponding decision signal.

The operation of the discriminating device constructed as above will now be described. The magnetic head 11 reads the recorded signal from the magnetic disc to provide a reproducing signal. The reproducing signal is applied to the reproducing amplifier 12, where it is amplified. The output of the amplifier 12 is applied to both the smoothing circuit 13 and the band-pass filter (BPF) 21.

The smoothing circuit 13 smooths the signal from amplifier 12 to output a signal corresponding to the envelope of the signal. The output of the smoothing circuit 13 is supplied as a tracking signal to a tracking circuit 26. The tracking circuit forms a tracking error signal to control the tracking of the magnetic head 11 using the tracking signal as a reference.

The output of the smoothing circuit 13 is further applied to the comparator 14, where it is compared with the reference voltage provided by the reference voltage generating circuit 15. The reference voltage is set to the value at which the presence or absence of the reproducing signal can be determined without being affected by noises. Accordingly, if the reproducing carrier is available, then the comparator 14 outputs the logic level "1" irrespective of the recording mode. If no reproducing carrier is available, the comparator 14 outputs the logic level "0". The output of the comparator 14 is supplied to a mute circuit (not shown) as a mute signal. When the output of the comparator 14 is the logic level "0", the mute circuit determines either that no video signal has been recorded on the magnetic disc or that the recorded video signal is not useful because the reproduction level is low and the noise level is high. Thus, the video signal output system is muted. The muting of the video signal output system is released when the comparator 14 outputs the logic level "1".

Band-pass filter 21 extracts the high-band mode carrier from the output of the reproducing amplifier 12, and the smoothing circuit 22 smooths the output of the band-pass filter 21. The reference voltage provided by the reference voltage generating circuit 24 is set to the value at which the high-band mode carrier can be detected without being affected by noises. Accordingly, the comparator 23 outputs the logic level "1" when the high-band mode carrier is extracted and outputs the logic level "0" when the normal mode carrier is reproduced or when the reproducing level is smaller than a certain level.

The outputs of the comparators 14 and 23 are input to AND gate 25. When the normal mode or high-band mode carrier is available at a sufficiently high level, the output of the comparator 14 is at the logic level "1". Therefore, when the normal mode carrier is detected, the AND gate 25 outputs the logic level "0" and when the high-band mode carrier is detected, the AND gate 25 provides the logic level "1". If none of the carriers are available, or the available carriers are low in level, the output of the comparator 14 is set to the logic level "0". Therefore, the AND gate 25 is disabled so that the output of the comparator is not transmitted. Thus, an erroneous detection is not carried out when reproduction of a video signal has been muted because of low picture quality.

In the above-described embodiment, the high-band mode carrier is detected using the band-pass filter 21. However, the mode discriminating device may be modified so that the normal mode carrier is detected. If, in the modification, the input terminals of the comparator 23 are reversed in polarity, then the decision signals are the same in polarity as those in FIG. 1.

As was described above, in the mode discriminating device of the present invention, the level of the reproducing signal and the level of the carrier included in it are used to determine the recording mode. As a result, the number of band-pass filters can be decreased, and the device can be miniaturized.

What is claimed is:

1. A mode discriminating device for discriminating between a reproduced signal of a first mode associated with a first carrier of a first frequency and a reproduced signal of a second mode associated with a second carrier of a second frequency, said device comprising:

reproducing means for reproducing a signal from a recording medium;

first means for detecting the presence of said reproduced signal and for providing a first logic signal, said first logic signal having a first logic state only when a reproduced signal of one of said first and second modes has been detected, and regardless of which of said first and second modes is present in said reproduced signal, and having a second logic state at all other times, said first logic state of said first logic signal comprising a first detection signal,;

second means for detecting the presence of a particular one of said first and second frequencies in said reproduced signal and for providing a second logic signal, said second logic signal having a first logic state only when said particular one of said first and second frequencies has been detected, and having a second logic state at all other times, said first logic state of said second logic signal comprising a second detection signal; and third means responsive to said first and second detection signals for providing a mode discriminating signal indicating the mode of said reproduced signal.

2. A mode discriminating device according to claim 1, wherein said reproduced signal includes a frequency modulated luminance component, and wherein said first mode is a high-band mode wherein said frequency modulated luminance component is associated with said first carrier occupying a first frequency range and said second mode is a normal mode wherein said frequency modulated luminance component is associated with said second carrier occupying a second frequency range lower than said first frequency range.

3. A mode discriminating device according to claim 1, wherein said third means comprises an AND gate.

4. Mode discriminating device according to claim 1, wherein said second means comprises:

means for extracting said first carrier from said reproduced signal and for providing an output corresponding to a level of said first carrier; and means for comparing said output of said extracting means with a predetermined reference voltage level and providing said second logic signal as an output.

5. A mode discriminating device according to claim 4, wherein said reproduced signal includes a frequency modulated luminance component, and wherein said first mode is a high-band mode wherein said frequency modulated luminance component is associated with said first carrier occupying a first frequency range above 7.7 Mhz.

6. A mode discriminating device according to claim 4, wherein said reproduced signal includes a frequency modulated luminance component, and wherein said second mode is a normal mode wherein said frequency modulated luminance component is associated with said second carrier occupying a second frequency range lower than said first frequency range.

7. A mode discriminating device according to claim 1, wherein said first means comprises a comparator which compares the level of said reproduced signal with a predetermined reference voltage level and produces said first logic signal as an output.

8. A mode discriminating device according to claim 1, wherein said first logic signal is provided as a mute signal when the level of said reproduced signal is low.

9. A mode discriminating device according to claim 8, said mode discriminating signal having a predetermined logic level in response to a predetermined logic level of said mute signal, irrespective of the value of said first logic signal.

10. A mode discriminating device according to claim 1, wherein said reproduced signal is supplied to a tracking error signal circuit for generation of a tracking error signal based on said reproduced signal.

* * * * *